United States Patent [19]

Tischer

[11] Patent Number: 4,756,330

[45] Date of Patent: Jul. 12, 1988

[54] FLOW DIVIDER VALVE

[75] Inventor: Werner Tischer, Heubach-Lautern, Fed. Rep. of Germany

[73] Assignee: Zahnradfabrik Friedrichshafen, AG., Friedrichshafen, Fed. Rep. of Germany

[21] Appl. No.: 27,338

[22] Filed: Mar. 18, 1987

[30] Foreign Application Priority Data

Mar. 21, 1986 [WO] PCT Int'l Appl. .................. PCT/EP86/00165

[51] Int. Cl.[4] .............................................. G05D 11/02

[52] U.S. Cl. ................................. 137/101; 137/625.3; 137/625.35

[58] Field of Search ...................... 137/101, 118, 625.3, 137/625.35, 625.38

[56] References Cited

U.S. PATENT DOCUMENTS

| | | | |
|---|---|---|---|
| 90,427 | 5/1869 | Conde | 137/625.38 |
| 3,421,532 | 1/1969 | Davidson | 137/101 |
| 3,437,103 | 4/1969 | Yoshino | 137/101 |
| 3,500,854 | 3/1970 | Altmeppen | 137/118 |
| 3,924,650 | 12/1975 | Parquet | 137/101 |
| 3,990,475 | 11/1976 | Myers | 137/625.3 |

FOREIGN PATENT DOCUMENTS 1298801 2/1970 Fed. Rep. of Germany .

*Primary Examiner*—Robert G. Nilson

*Attorney, Agent, or Firm*—Zalkind & Shuster

[57] ABSTRACT

In a flow divider valve for pressure feed to a hydraulic circuit for auxiliary power steering and to a hydraulic circuit for a power take-off the interior of a hollow regulator piston receives pressure feed for distribution to the hydraulic circuits. For one such circuit, preferably the power take-off, flow passes via multiple bores and coacting flow control grooves of the regulator piston and a housing in which it reciprocates. Accordingly, a desired flow quantity and pressure advantages are achieved, in comparison with use of a single flow control bore which would require a larger piston traverse causing delays in pressure build-up as well as oscillations and strong flow pulses and energy loss.

2 Claims, 1 Drawing Sheet

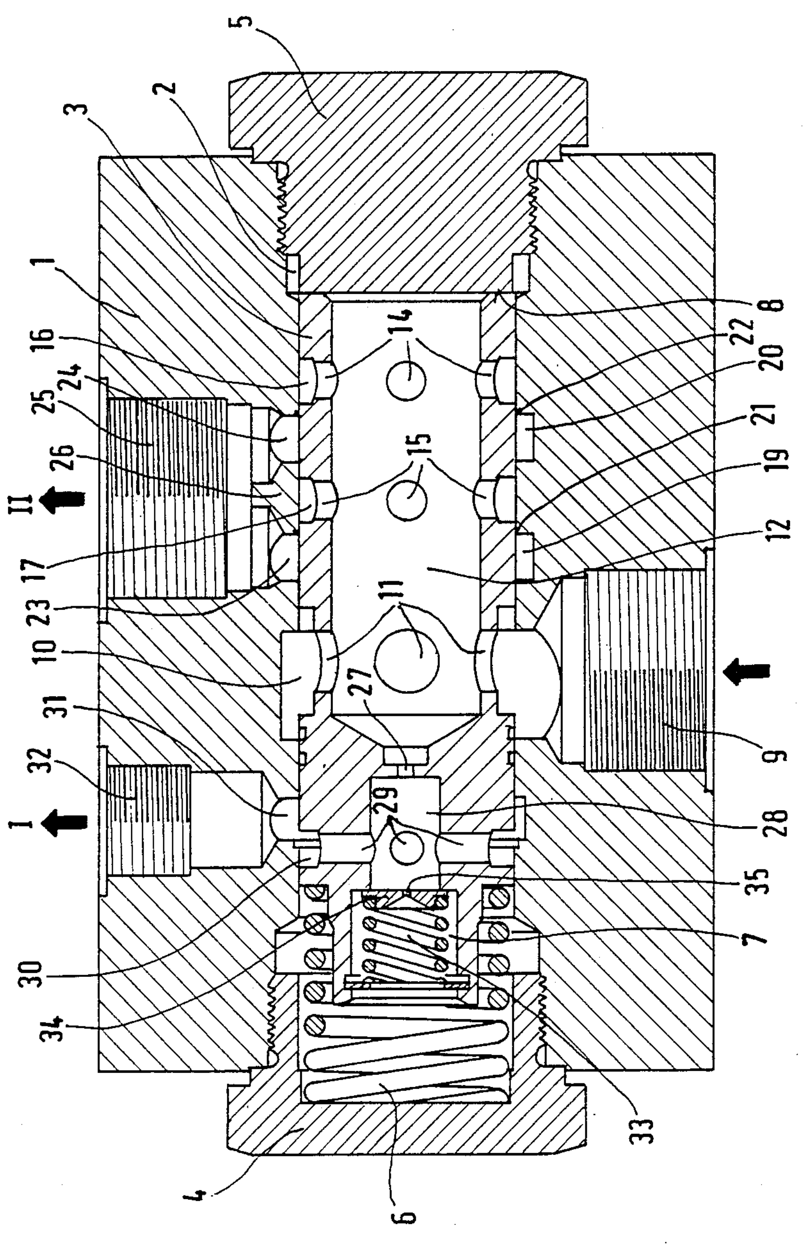
1
2
3
5
8
14
16
22
20
24
25
26
15
21
19
12
17
23
10
11
27
31
32
II
I
9
28
29
35
7
30
34
33
4
6

FLOW DIVIDER VALVE

BACKGROUND OF THE INVENTION

A flow divider valve is disclosed in U.S. Pat. No. 3,500,854, for use in a vehicle wherein a hydraulic circuit for power steering purposes is provided and a second hydraulic circuit for power takeoff in a tractor, excavator, shovel loader, or the like. The flow divider valve is likewise required to provide a power steering circuit with a primary conveying flow, only the excess being used for power takeoff. Inasmuch as the flow for power steering is needed only during steering, it is only at that time that flow distribution from the valve is effected, in response to the amount of flow required, which is dependent on the angle of turn. Accordingly, for load dependent distribution of flow, the regulating piston is provided with a throttling point in the feed line to the hydraulic circuit to be provided with pressure fluid. Furthermore, such regulating piston is loaded by a spring against the pressure from a feed-in bore. Therefore, due to differential forces acting at opposite ends of the regulating piston, the valve shifts against the force of the spring dependent on such pressure difference whereby flow control edges of the valve can release pressure flow to a second hydraulic circuit for power takeoff.

Flow divider valves have a hydraulic response corresponding to the passage arrangement for flow and regulation which corresponds to the degree of opening of the flow control edges.

There are at least two flow control edge regulating positions which are changed in either of the hydraulic circuits corresponding to pressure buildup. High pressure differences, however, lead to a heating up of the pressure oil and to losses of energy which have a negative effect on the energy balance of the flow divider valve. Accordingly, as low as possible a pressure difference is desirable. If, however, it is desired to reduce the pressure difference or the resistance of pressure oil flowing through the valve, it is necessary for the flow control edges of the regulating piston coacting with the housing to effect a large flow gap when open. The result is that in a pressure buildup contained in either hydraulic circuit large movements of the regulating piston are necessary. Such large movements delay pressure buildup and also cause flow oscillations and strong flow pulsations. It is also advantageous where large flows are desired through circuit passages, high pressures are required dependent on the position of a regulating piston relative to the housing, viz., the degree of separation of the valve and housing coacting flow control edges to effect flow gaps.

BRIEF DESCRIPTION OF THE INVENTION

The present invention is for a flow divider valve of the kind generally described above, but which makes possible a low pressure difference on the valve and low flow resistance while achieving the advantages of minimizing delay in pressure buildup as well as oscillations and strong flow pulsations.

Thus, in the present invention the distribution of flow for either or both hydraulic circuits is accomplished through dual flow control edges and thus dual flow gaps which reduces the stroke of the regulating piston by providing two paths for oil flow. Accordingly, such reduction in piston movement permits a quicker buildup of pressure with lesser flow forces acting against the piston. Also, a smaller acceleration of flow results which reduces the danger of excess flow oscillations during regulation.

The control edges which control flow through separation of edges to effect a flow gap may be formed in various ways. For example, such edges may be formed by two or more channels, annular grooves and bores, and flow control grooves and bores in coaction between the piston and the housing and spaced axially in the piston movement direction.

For a flow divider valve for use in vehicles in accordance with the invention, the flow control edges are generally in the circuit for power takeoff, i.e., with dual flow paths. However, the same arrangement can be used for the flow paths for power steering flow utilizing double flow paths, if so desired.

For simple manufacture, two parallel bores may be axially spaced facing into an outlet bore of the housing with a bridge disposed between such bores for separation into twin flow paths.

Pressure oil feed in may pass through a bore in the housing and enter into a hollow regulating piston, whereby pressure oil feeds into radial bores in the piston for flow to annular grooves in the housing which feed dual bores in the housing connecting to an outlet bore for either hydraulic circuit.

Details of various components not mentioned herein can be discerned from U.S. Pat. No. 3,500,854, hereinabove mentioned.

A detailed description of the invention now follows in conjunction with the appended drawing showing a longitudinal section of the flow divider valve.

In a housing 1, a regulating piston 3 is disposed in a cylindrical, longitudinal bore 2. The longitudinal bore 2 is closed by covers 4 and 5. Between cover 4 and the regulating piston 3, a regulating spring 6 is disposed in a pressure chamber 7. The cover 5 disposed on the opposite side of and as is the cover 4; screwed into the housing 1, and effects an abutment stop 8 for the regulating piston 3.

On the peripheral side in the housing 1, a feed bore 9 is provided connecting to an annular channel 10 and several radial bores 11 of an interior chamber 12 of the regulating piston. The chamber 12, has two rows of radial bores 14 and 15 axially arrayed leading into respective annular grooves 16 and 17 on the periphery of the regulating piston 3.

Two interiorly of the housing annular grooves 19 and 20 are axially spaced to coact with the annular grooves 16 and 17 to effect flow control edges 21 and 22 which will be understood to separate when the valve shifts so as to make flow gaps for oil passage. From from the annular grooves 19 and 20, connecting bores 23 and 24 lead to an outlet bore 25 from which a connecting line, not shown, leads to an operating circuit II for pressure agent flow to an operating hydraulic, e.g. a power takeoff, of a vehicle. The twin connecting bores 23 and 24 are axially parallel the outlet bore 25 and—similarly the annular grooves 10 and 20—are separated from each other by a housing bridge 26 understood to be an integral part of the housing.

At the end of the regulating piston 3 distance from cover 5, there is a throttle 27 as a connection between chamber 12 and a downstream pressure chamber 28 chamber 28 has several radial bores 29 leading to an annular peripheral groove 30 in the regulating piston 3 for connection via annular groove 31 in the housing to an outlet bore 32 for pressure flow to an operating circuit I. The operating circuit I serves for to supply an auxiliary power steering with a pressure agent.

The end of the pressure chamber 28 opposite throttle 27 is closed by a damping plate 34 loaded with a spring 33 which plate has a damping bore 35.

The flow divider valve according to the invention functions basically in the customary manner for which reason its manner of action will only be described briefly below.

A pump, not shown, always feeds whatever maximum pressure is required via feed bore 9. At the control edges 20 and 21 and at the control edges between the annular grooves 30 and 31, a pressure difference develops. Whenever a maximal pressure is required in the operating circuit I, then the full pressure is governed at the control edges 21 and 22 as a result of which the regulating piston shifts to the right and thus the control edges 20 and 21 close. As a result of that the maximum pressure is available for the supply of the operating circuit I, i.e., of the auxiliary power steering.

Whenever no pressure is required in the operating circuit I, the full pressure and thus also the full conveying flow may be fed to the operating circuit II. On the basis of the prevailing pressure conditions, the regulating piston 3 in that case is shifted to the left, whereby the control edges between the annular groove 30 and the annular groove 31 are closed. In this manner, the control edges 21 and 22 are fully opened and the entire conveying flow is fed to the operating circuit II.

In the same manner, intermediate positions are possible.

The damping spring 33 and the damping plate 34 with the damping bore 35 serve as a damping arrangement. Whenever the regulating piston 3 is shifted to the right, then this is possible without delay, for the pressure plate is lifted off its contact surface wherefore a quick, secondary suction into the pressure chamber 7 is possible. In the reverse direction however the regulating piston 3 may be moved only slowly since the excess oil may escape from the pressure chamber 7 only slowly by way of the damping bore 5. In this manner in the case of need, the operating circuit I very quickly receives the required pressure agent as a result of which negative reactions will be avoided on the auxiliary power steering.

I claim:

1. In a flow divider valve for the distribution of pressure feed to at least two hydraulic circuits, comprising a housing (1) with a regulator piston (3) reciprocal in a central bore (2) of said housing and said housing having outlets (25, 32) for respective circuits whereby, for the distribution of pressure feed by said flow divider valve, said housing and said regulator piston have coacting flow passages effecting control edges wherein the housing has flow passages connected to said outlets; the improvement wherein at least for one hydraulic circuit (II) there are at least two flow control edges (21,22) comprising exterior grooves (16, 17) on said piston coacting with interior grooves (19, 20) in said housing connected to one said outlet (25), for controlling pressure feed thereto, the control edges (21,22) being axially spaced; including radial bores (14, 15) in said piston connecting from the interior to respective grooves (16, 17) thereon, including two bores (23,24) in said housing connecting to the outlet bore (25) for flow from respective grooves (16, 17) of said regulator piston and being separated by bridge means (26) disposed in the housing (1),

2. In a flow divider valve as set forth in claim 1, including a pressure inlet bore (9) connected with the interior (12) of said regulator piston (3) for pressure feed to said radial bores (14,15) leading to the grooves (16,17) in the regulator piston (3) for pressure feed to said housing bores (23, 24).

* * * * *